US009002411B2

(12) United States Patent
Moore et al.

(10) Patent No.: US 9,002,411 B2
(45) Date of Patent: Apr. 7, 2015

(54) METHOD AND SYSTEM FOR PROVIDING ELECTRONIC MEDIA ON WEARABLE DISPLAYS

(75) Inventors: Devin C. Moore, Lewis Center, OH (US); Wade P. Thompson, Moore, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 13/225,376

(22) Filed: Sep. 2, 2011

(65) Prior Publication Data

US 2013/0059526 A1 Mar. 7, 2013

(51) Int. Cl.

*H04M 1/00* (2006.01)
*H04B 1/38* (2006.01)
*G09F 21/02* (2006.01)

(52) U.S. Cl.

CPC .................................... *G09F 21/026* (2013.01)

(58) Field of Classification Search

CPC .................................................. G06Q 30/0277
USPC ............................ 455/404.1, 404.2, 566, 567
See application file for complete search history.

(56) References Cited

U.S. PATENT DOCUMENTS

| | | | | |
|---|---|---|---|---|
| 7,486,194 | B2 * | 2/2009 | Stanners et al. | 340/574 |
| 8,626,586 | B1 * | 1/2014 | Biere et al. | 705/14.49 |
| 2007/0063850 | A1 * | 3/2007 | Devaul et al. | 340/573.1 |
| 2011/0214158 | A1 * | 9/2011 | Pasquero et al. | 726/2 |

* cited by examiner

*Primary Examiner* — Tilahun B Gesesse

(57) ABSTRACT

An approach for providing electronic media on clothing is described. A media to be presented on a wearable device that includes one or more displays is determined. A determination is made as to whether the wearable device is registered with a media delivery service offered by a service provider. The transfer of the media is initiated over a wireless network to a mobile device if the wearable device is registered with the media delivery service, wherein the media is presented on the one or more displays of the wearable device.

16 Claims, 10 Drawing Sheets

METHOD AND SYSTEM FOR PROVIDING ELECTRONIC MEDIA ON WEARABLE DISPLAYS

BACKGROUND INFORMATION

Service providers are continually challenged to deliver value and convenience to consumers by providing compelling network services and advancing the underlying technologies. One area of interest has been the development of services and technologies relating to advertising. For example, in recent years, advertisements on conventional billboards and posters have been replaced or supplemented with advertisements on electronic billboards, posters, and other displays due to the advantages of electronic advertising. The use of electronic displays, for instance, enables advertisers, developers, and other content providers to modify the presentation of advertisements or other information without physically replacing the displays, allowing for increased efficiency in updating and more relevant content. Unfortunately, little effort has been spent on involving the consumers themselves in providing media, in this context.

Therefore, there is a need for an effective approach for disseminating electronic media, particularly in the context of advertising.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing electronic media on clothing are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
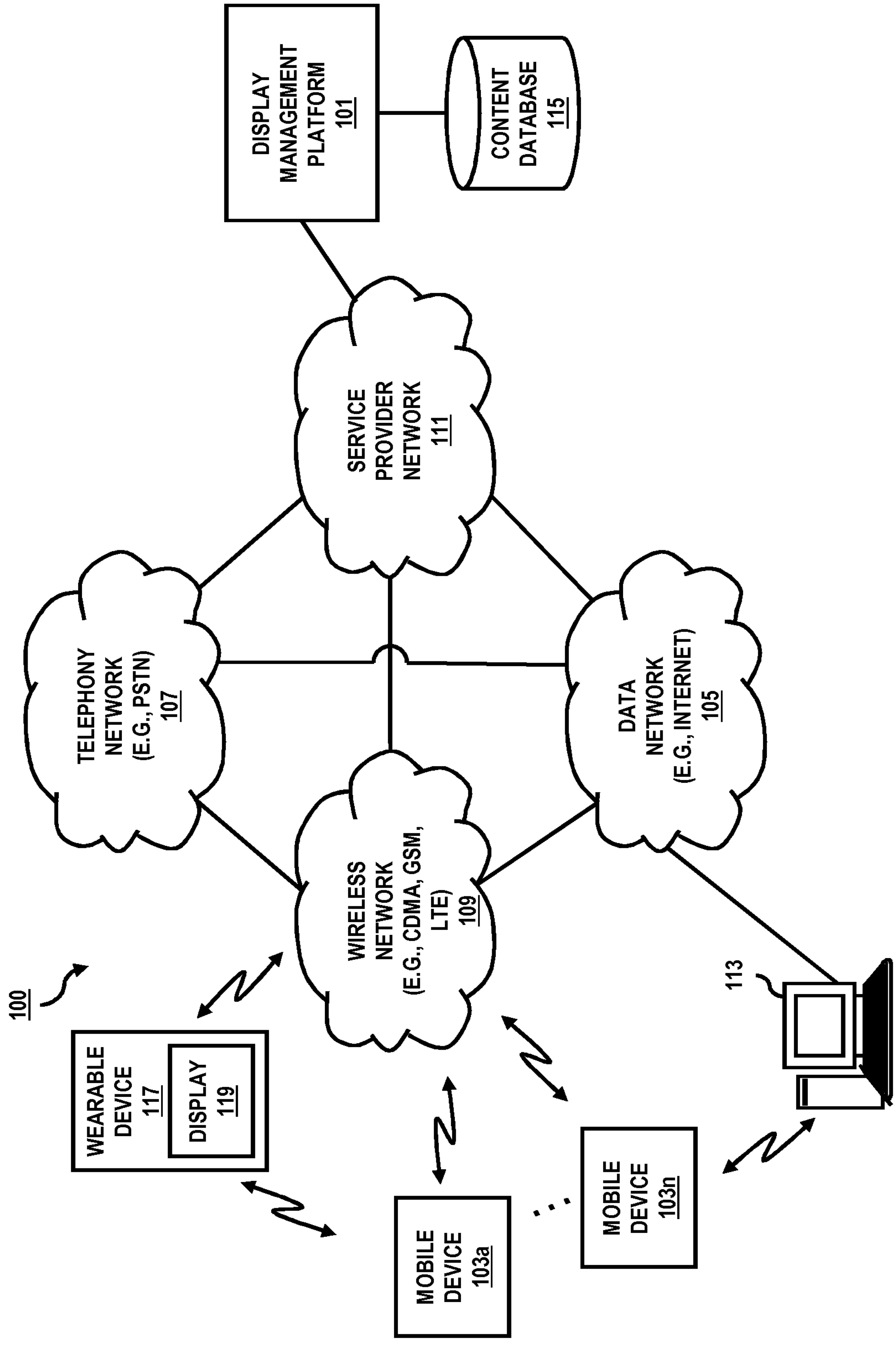
FIG. 1 is a diagram of a system capable of providing electronic media on clothing, according to an exemplary embodiment.

FIG. 1 is a diagram of a system capable of providing electronic media on clothing, according to an exemplary embodiment. For the purpose of illustration, the system 100 employs a display management platform 101 that is configured to provide electronic media on wearable displays that may be affixed to or integrated with clothing. The media can be received by one or more user devices (e.g., mobile devices 103) over one or more networks (e.g., data network 105, telephony network 107, wireless network 109, etc.). According to one embodiment, services including electronic media delivery may be part of managed services supplied by a service provider (e.g., a wireless communication company) as a hosted or subscription-based service made available to users of the mobile devices 103 through a service provider network 111. Traditionally, electronic displays generally have not been adopted for promotional and informational clothing due to many factors, such as weight and rigidness of typical electronic displays, discomfort for the wearer, etc. As such, promotional and informational clothing remain restricted to conventional methods. In some embodiments, media or electronic media can include textual data, images, video, audio, or a combination thereof.

As shown, the display management platform 101 may be a part of or connected to the service provider network 111. According to another embodiment, the display management platform 101 may be include within or connected to a computer device 113, the mobile devices 103, etc. While specific reference will be made thereto, it is contemplated that the system 100 may embody many forms and include multiple and/or alternative components and facilities. Display management platform 101, in some embodiments, can provide effective advertising to consumers through "electronic paper" displays on cellular-enabled clothing.

In certain embodiments, the display management platform 101 may include or have access to a content database 115. For example, the display management platform 101 may access the content database 115 to acquire user preference information, context information, media to be presented on a wearable device 117 (or wearable devices 117) that includes one or more displays 119. User preference information, the user's context information, and presence information may, for instance, be used to determine whether or not to present certain media content on the wearable device 117 of a particular user. In one scenario, a user may be in classroom environment where the user has indicated that no advertising or other media content should be received. As such, the display management platform 101 may prevent all media content from being presented on the wearable device 117 until the user is outside the classroom environment.

As mentioned, the reach of electronic advertising has grown in recent years, extending well beyond television commercials, promotional content in the movies, and web page advertisements. Electronic advertising, for instance, currently make up a substantial segment of billboard and poster advertisements. In contrast to traditional billboards and posters, electronic advertising provide a number of advantages, including faster updates (e.g., real-time updates) and increased relevancy (e.g., based on the current time). However, even with these advantages, electronic advertising for promotional and informational clothing has not seen similar development or commercial success. Factors contributing to the lack of electronic advertising on clothing include the weight and rigidness of typical electronic displays, inability to practically meet power requirements of such displays for everyday use, discomfort for the wearer, etc. As such, promotional and informational clothing remain restricted to conventional methods.

To address this issue, the system 100 of FIG. 1 introduces the capability to provide electronic advertising and other media on clothing. By way of example, the display management platform 101 may determine media to be presented on the wearable device 117 that includes one or more displays 119 and then initiate transfer of the media over a wireless network (e.g., cellular network 109) to the mobile device 103 to be presented on the one or more displays 119 of the wearable device 117. The wearable device 117 may, for instance, include jackets, t-shirts, jeans, bracelets, watches, or any other clothing item. The one or more displays 119 may advantageously include an electronic paper display to reduce the power requirements of the wearable device 117 while remaining both durable and flexible.

By way of another example, the media may be received at the mobile device 103 for presentation on the one or more displays 119 of the wearable device 117. Because the user may not also be wearing the wearable device 117, the display management platform 103 may, via the mobile device 103, monitor for the availability of the wearable device 117. Upon detection the presence of the wearable device 117, the display management platform 103 may establish, via the mobile device, a communication link with the wearable device 117 and then initiate transmission of the media to the wearable device 117 over the communication link to be presented on the one or more displays 119. The following scenarios illustrate typical situations which display management platform 101 can be more effective in providing electronic advertising or other media content to consumers.

In one scenario, the user may be subscribed with a media delivery service that provides promotional media to a cellular-enabled jacket (e.g., wearable device 117 including the mobile device 103) worn by the user. In exchange for wearing the jacket, the media delivery service may pay the user based on the type and the number of advertisements that is presented on the jacket. Because it may be disadvantageous for the media delivery service to pay the user for advertising when the number of viewers are low, the advertisements may be distributed to or presented on the jacket based on context information (e.g., based on the current time and location of the user). In another scenario, the media delivery service and the user may agree that the media delivery service will purchase the jacket for the user in exchange for allowing the media delivery service to distribute and present advertisements on the jacket. For example, the jacket may be sports gear (e.g., snowboarding jacket) and, thus, provides the user with substantial utility with respect to a particular activity. Additionally, the agreement between the media delivery service and the user may allow the user to select the type of advertisements that will be presented on the jacket. As such, the advertisements may be distributed to or presented on the jacket based on preference information associated with the user.

In certain embodiments, the wearable device 117 may include the mobile device 103 or a separate receiver circuitry to receive the media, for instance, over the cellular network 109. By way of example, a pair of shoes, a t-shirt, or a hat may be cellular-enabled. In this way, the media delivery service may eliminate the need for the user to carry around a second device in order to present advertisements on the one or more displays 119 of the wearable device 117. In certain other embodiments, the wearable device 117 may be configured to only receive data to avoid the additional power requirements of data transmissions.

It is noted that the mobile devices 103 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 103 may support any type of interface for supporting the presentment or exchange of data. In addition, mobile devices 103 may facilitate various input means for receiving and generating information, including touch screen capability, keyboard and keypad data entry, voice-based input mechanisms, accelerometer (e.g., shaking the mobile device 103), and the like. Any known and future implementations of mobile devices 103 are applicable. It is noted that, in certain embodiments, the mobile devices 103 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of mobile devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 103, i.e., IP addresses that are accessible to devices connected to the service provider network 111 as facilitated via a router. It is further noted that the wearable device 117 may also support the above interfaces, facilitate the above various input means, and establish the above communication sessions based on the variety of technologies, such as NFC, Bluetooth, WiFi, infrared, etc.

In various embodiments, the media may be filtered based on content according to a predetermined criterion. As indicated, the predetermined criterion may be context information and/or preference information associated with the user. In addition, or alternatively, the predetermined criterion may be file size, the content type, etc. For example, if the wearable device 117 is a pair of sunglasses, the pair of sunglasses may not have sufficient memory available to receive media above specified file size.

In further embodiments, one or more display identifiers specifying which of the one or more displays 119 are to present the media may be received. By way of example, each of the displays 119 may respectively be associated with a particular display identifier. In one use case, the front of a motorcycle jacket may include a front display with a display identifier "FRONT" and the back of the motorcycle jacket may include a back display with a display identifier "BACK." If, for instance, the display management platform 101 detects that the user is in a "riding" mode (e.g., the user is riding the motorcycle), the display management platform 101 may limit certain advertisements to the back display by associating the advertisements with the display identifier "BACK." In this way, services may offer different pricing levels for advertisements. A higher price level may provide advertisers with a higher probability for viewers (e.g., the back display while the user is riding the motorcycle), while a lower price level may provide a lower probably for viewers.

In other embodiments, the communication link (e.g., for communication between the mobile device 103 and the wearable device 117) may be established over another wireless network (e.g., short-range wireless network such as Bluetooth, NFC, wireless fidelity (WiFi), etc.) that is different from the wireless network. By way of example, the wireless network may be the cellular network 109 while the other wireless network may be a Bluetooth network. As such, the media may be transmitted from the mobile device 103 to the wearable device 117 locally through a Bluetooth communication session, mitigating traffic congestion on the cellular network 109. In addition, the use of a short-range wireless network, such as Bluetooth, by the wearable device 117 for receiving the media may further reduce the power requirements of the wearable device 117, as compared to receiving the media over the cellular network 109.

In some embodiments, the display management platform 101, the mobile devices 103, and other elements of the system 100 may be configured to communicate via the service provider network 111. According to certain embodiments, one or more networks, such as the data network 105, the telephony network 107, and/or the wireless network 109, may interact with the service provider network 111. The networks 105-109 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 107 may include a circuit-switched network, such as the public switched telephone network (PSTN), an integrated services digital network (ISDN), a private branch exchange (PBX), or other like network. Meanwhile, the wireless network 109 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 105-109 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that the networks 105-109 may include components and facilities to provide for signaling and/or bearer communications between the various components or facilities of the system 100. In this manner, the networks 105-109 may embody or include portions of a signaling system 7 (SS7) network, Internet protocol multimedia subsystem (IMS), or other suitable infrastructure to support control and signaling functions.

Figure 2:
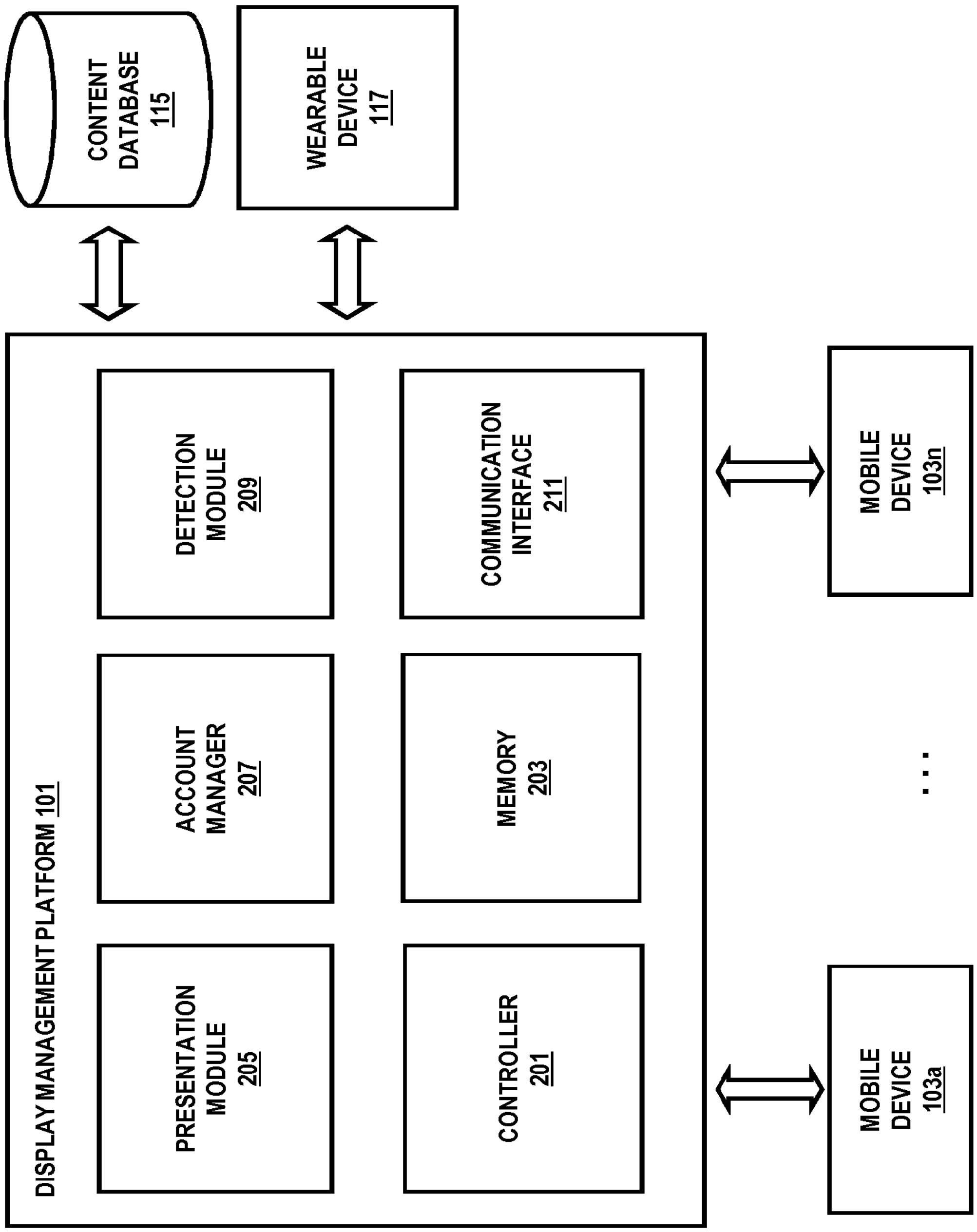
FIG. 2 is a diagram of the components of a display management platform, according to an exemplary embodiment.

FIG. 2 is a diagram of the components of a display management platform, according to an exemplary embodiment. The display management platform 101 may comprise computing hardware (such as described with respect to FIG. 9), as well as include one or more components configured to execute the processes described herein for providing electronic media services of the system 100. It is contemplated that the functions of these components may be combined in one or more components or performed by other components of equivalent functionality. In one implementation, the display management platform 101 includes a controller (or processor) 201, memory 203, a presentation module 205, an account manager 207, a detection module 209, a communication interface 211.

The controller 201 may execute at least one algorithm for executing functions of the display management platform 101. For example, the controller 201 may interact with the presentation module 205 to determine media to be presented on the wearable device 117 that includes the one or more displays 119. The presentation module 205 may then work with the account manager 207 to determine whether the wearable device 117 is registered with a media delivery service offered by a service provider. If the account manager 207 determines that the wearable device 117 is a registered device, the presentation module 205 may initiate transfer of the media over a wireless network (e.g., the cellular network 109) to the mobile device 103 to be presented on the one or more displays 119 of the wearable device 117. On the other hand, if the account manager 207 determines that the wearable device 117 is not a registered device, the presentation module 205 may not initiate the media transfer, but instead prompt the user accordingly, or offer to register the wearable device 117 and/or subscribe the user associated with the wearable device 117.

Consequently, the mobile device 103 may receive the media over the wireless network (e.g., cellular network 109) to be presented on the wearable device 117. The mobile device 103 may then, via the detection module 209 of the display management platform 101, monitor for the presence of the wearable device 117. Upon detecting the presence of the wearable device 117, the mobile device 103 may establish a communication link with the wearable device 117 and initiate transmission of the media to the wearable device 117 over the communication link for presentation of the media on the one or more displays 119.

The controller 201 may further utilize the communication interface 211 to communicate with other components of the display management platform 101, the mobile devices 103, the wearable device 117, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, or other types of communication. According to one embodiment, such methods may be used to transmit messages to acquire permission from the user to establish present the media (e.g., an advertisement) on the one or more displays 119 of the wearable device 117.

Figure 3:
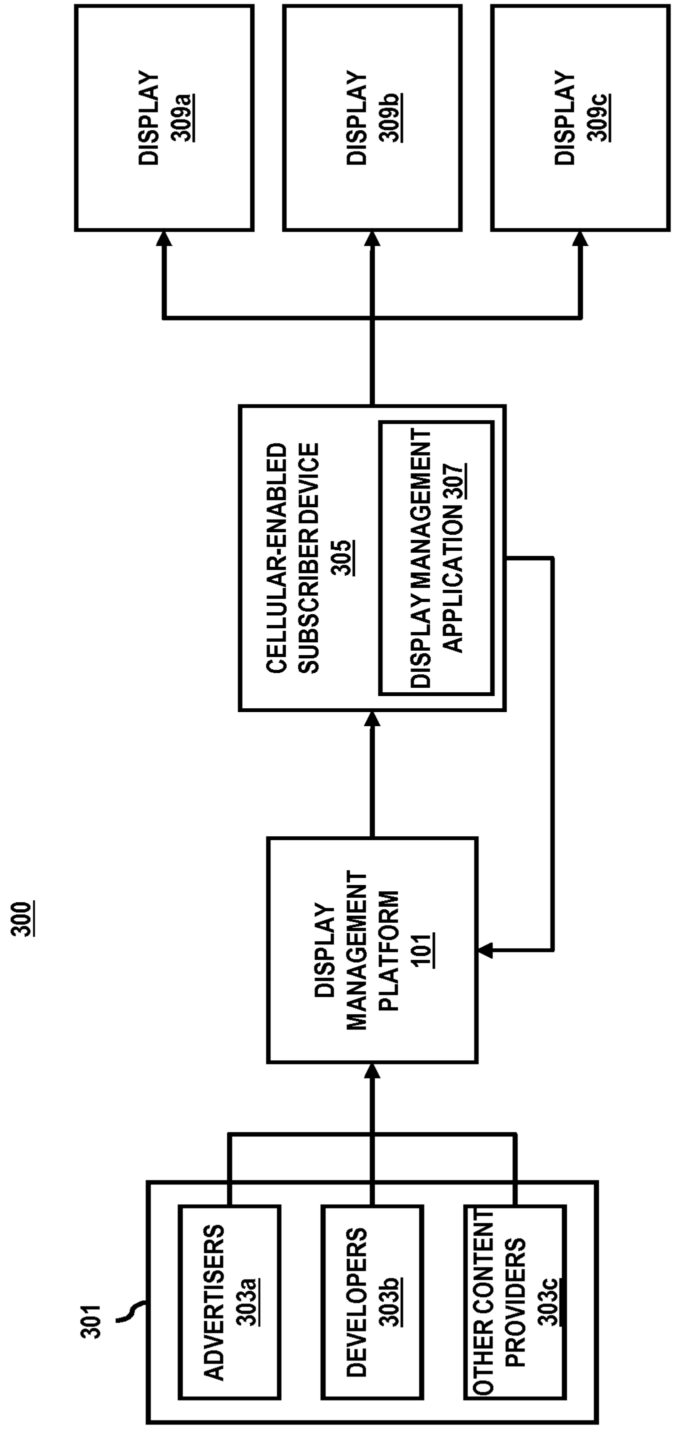
FIG. 3 is a distribution diagram for providing electronic media to one or more displays, according to an exemplary embodiment.

FIG. 3 is a distribution diagram for providing electronic media to one or more displays, according to an exemplary embodiment. For the purpose of illustration, diagram 300 is described with respect to FIG. 1. As shown, content providers 301 may include advertisers 303*a*, developers 303*b*, and other content providers 303*c*. The content providers 301 may provide media to a media delivery service that has access to or includes the display management platform 101. As discussed, the display management platform 101 may perform a number of functions for the media delivery service, including determining the media to be distributed to the cellular-enabled subscriber device 305, such as the mobile device 103 or the wearable device 117.

If, for instance, it is determined that the wearable device 117 is registered with the media delivery service, the display management platform 101 may initiate the transmission of the media over the cellular network 109 to the cellular-enabled subscriber device 305. Upon receiving the media, the display management application 307 of the cellular-enabled subscriber device 305 may work with the display management platform 101 to detect the presence of the wearable device 117. The display management application may also receive one or more display identifiers specifying which of displays 309*a*-309*c* to present the media. In one embodiment, the one or more display identifiers may be combined or received with the media over the cellular network 109. In another embodiment, the media and the one or more display identifiers may be received separately and/or independently of each other. For example, the media may be received during non-peak hours when the cellular traffic is reduced, while the one or more display identifiers may be received along with a template to customize the media for the wearable device 117 (e.g., based on context information).

Figure 4:
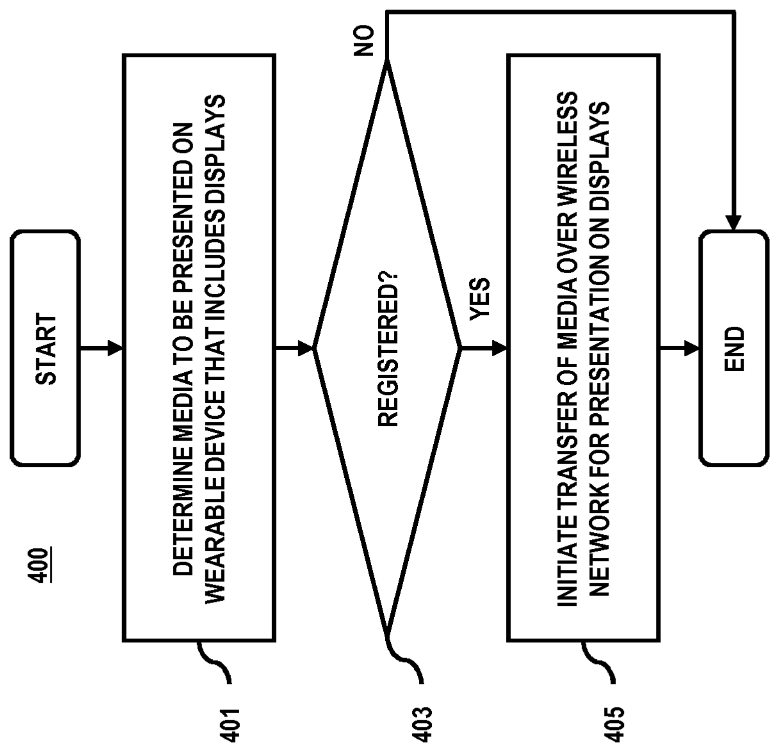
FIG. 4 is a flowchart of a process for providing electronic media on clothing, according to an exemplary embodiment.

FIG. 4 is a flowchart of a process for providing electronic media on clothing, according to an exemplary embodiment. For the purpose of illustration, process 400 is described with respect to FIG. 1. It is noted that the steps of the process 400 may be performed in any suitable order, as well as combined or separated in any suitable manner. In step 401, the display management platform 101 may determine media to be presented on the wearable device 117 that includes the one or more displays 119. By way of example, the display management platform 101 may filter the media based on content according to a predetermined criterion, such as file size, content types, etc. As discussed, the display management platform 101 may determine that the wearable device 117 only has sufficient memory to present advertisements or other media or a certain file size.

In step 403, the display management platform 101 may determine whether the wearable device 117 is registered with a media delivery service offered by a service provider. If, for instance, it is determined the wearable device 117 is registered, the display management platform 101 may, as in step 405, initiate transfer of the media over a wireless network (e.g., cellular network 109) to the mobile device 103 to be presented on the one or more displays 119 of the wearable device 117. On the other hand, if it is determined that the wearable device is not registered, the display management platform 101 may not initiate the media transfer.

Figure 5:
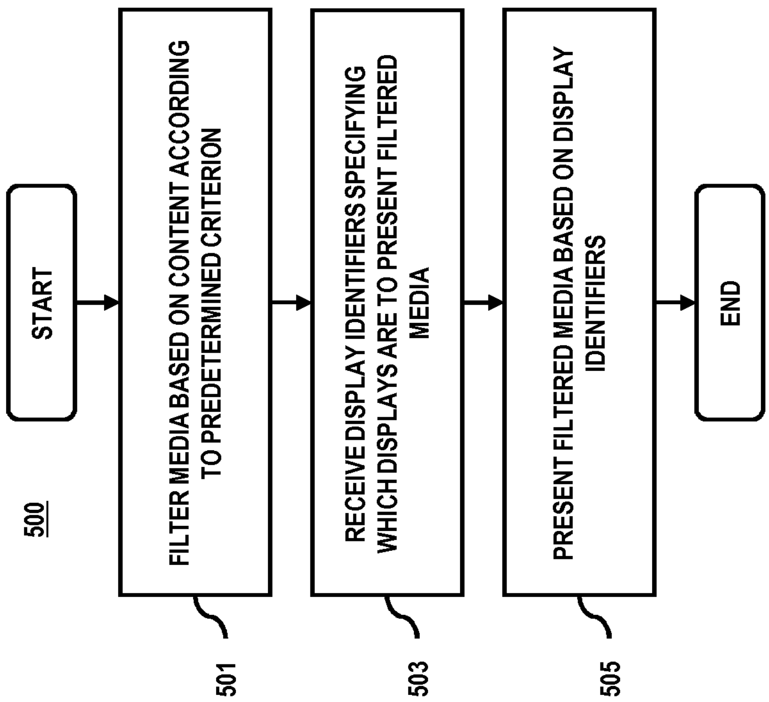
FIG. 5 is a flowchart of a process for filtering electronic media for one or more displays on clothing, according to an exemplary embodiment.

FIG. 5 is a flowchart of a process for filtering electronic media for one or more displays on clothing, according to an exemplary embodiment. For the purpose of illustration, process 500 is described with respect to FIG. 1. It is noted that the steps of the process 500 may be performed in any suitable order, as well as combined or separated in any suitable manner. As mentioned, the display management platform 101 may, as in step 501, filter the media to determine media for presentation on the wearable device 117 based on content according to a predetermined criterion. The predetermined criterion may, for instance, include file size, content type, etc.

In addition, the display management platform 101 may, as in step 503, also receive one or more display identifiers specifying which of the one or more displays are to present the filtered media. The one or more display identifiers may, for instance, be combined and/or transferred with the filtered media over the cellular network 109 to the mobile device 103 (or the wearable device 117). In addition, or alternatively, the filtered media and the one or more display identifiers may be received separately and/or independently of each other. As explained, the one or more display identifiers may be received independently as part of a template in order to customize the media for the wearable device. In one scenario, the template may be transmitted to the mobile device 103 (or the wearable device 117) as periodic or scheduled updates to modify the look and feel of advertisements based on the media already located on the mobile device 103 (or the wearable device 117). Accordingly, as in step 505, the customized filtered media may then be presented on the one or more displays 119 based on the one or more display identifiers.

Figure 6:
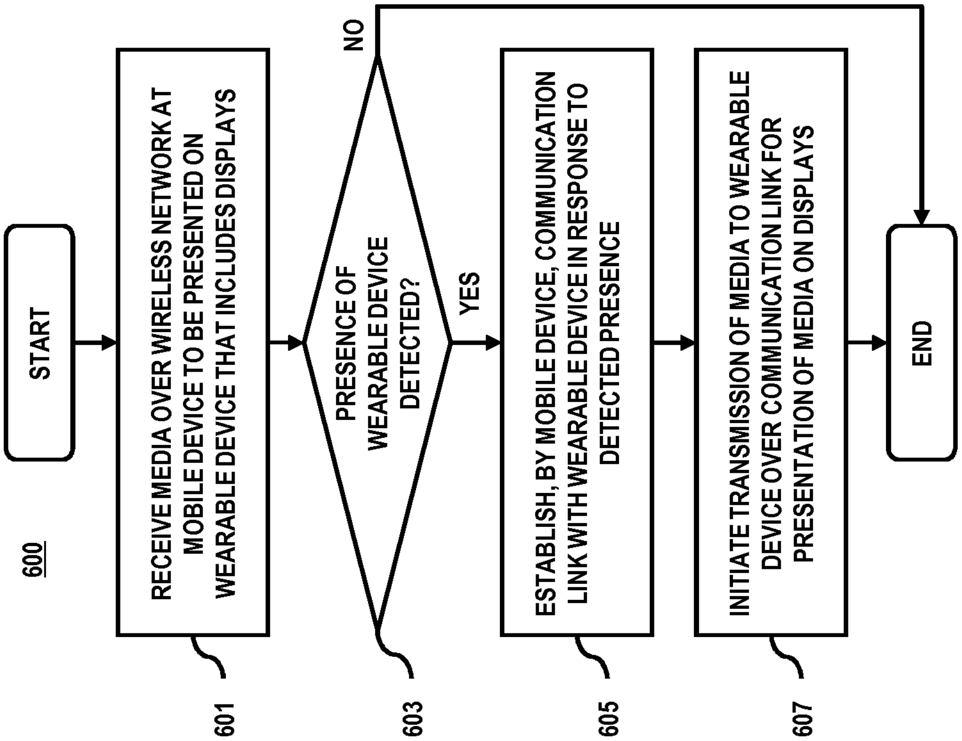
FIG. 6 is a flowchart of a process for transferring electronic media from a mobile device to clothing, according to an exemplary embodiment.

FIG. 6 is a flowchart of a process for transferring electronic media from a mobile device to clothing, according to an exemplary embodiment. For the purpose of illustration, process 600 is described with respect to FIG. 1. It is noted that the steps of the process 600 may be performed in any suitable order, as well as combined or separated in any suitable manner. In step 601, the mobile device 103 may receive the media over the wireless network (e.g., cellular network 109) to be presented on the wearable device 117 that includes the one or more displays 119.

If, for instance, the mobile device 103 detects (as in step 603) the presence of the wearable device 117, it may then in step 605 establish a communication link with the wearable device. On the other hand, if the presence of the wearable device 117 has not detected, the mobile device 103 may wait until the presence detection to initiate the communication link or transmit a message to the display management platform 101 indicating that presence of the wearable device 117 could not be detected. Accordingly, in step 607, the mobile device 103 may initiate transmission of the media to the wearable device 117 over the communication link for presentation of the media on the one or more displays 119. As discussed, the mobile device 103 may also receive one or more display identifiers to indicate which of the one or more displays are to present the media. As indicated, such an approach enables the media delivery service (or the content providers) to customize advertisements and other media to be presented on the wearable device 117.

Figure 7:
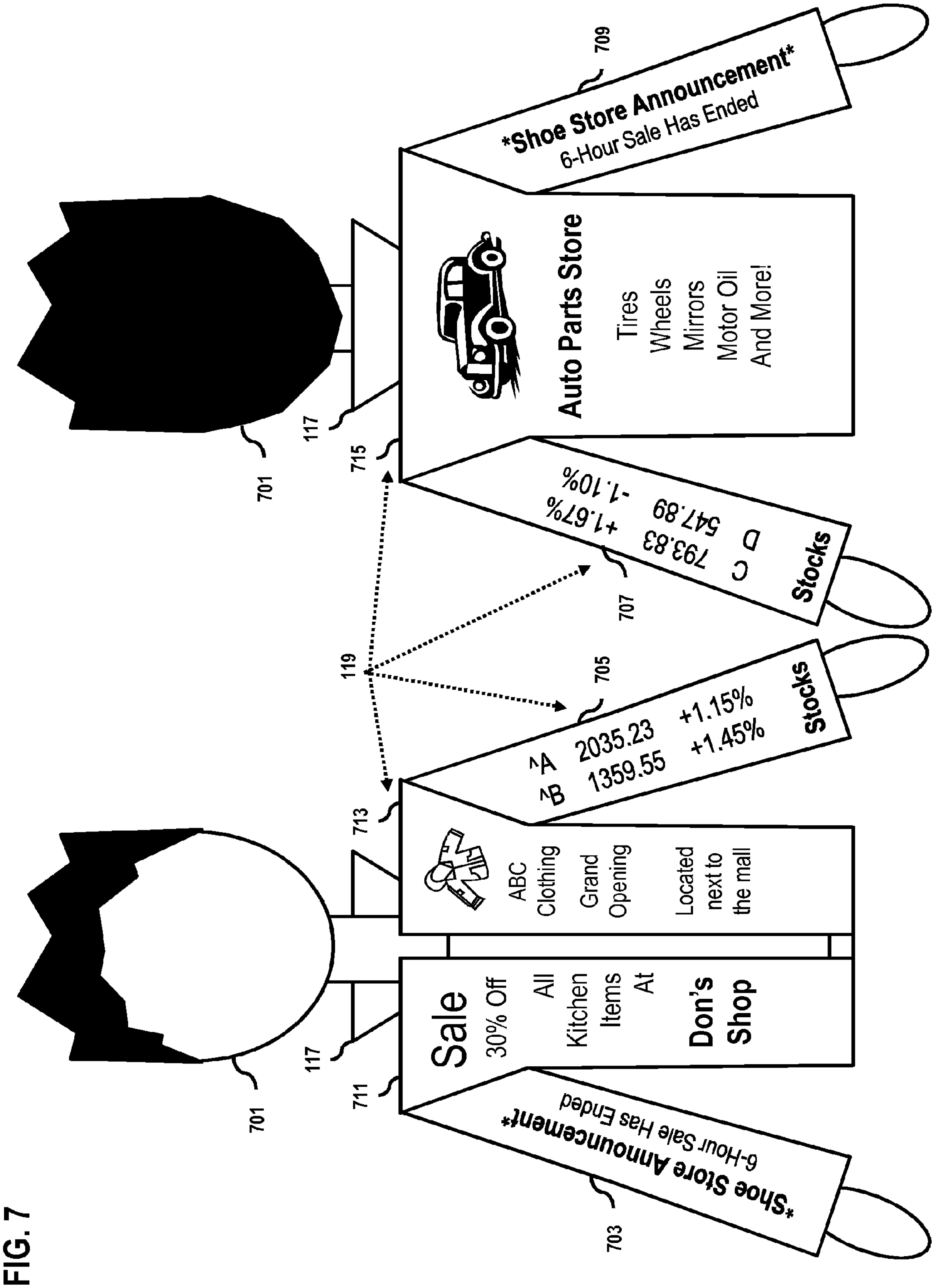
FIG. 7 is a diagram illustrating a wearable device for receiving electronic media, according to an exemplary embodiment.

FIG. 7 is a diagram illustrating a wearable device for receiving electronic media, according to an exemplary embodiment. For illustrative purposes, the diagram is described with reference to the system 100 of FIG. 1. As shown, the user 701 is wearing the wearable device 117, which includes the one or more displays 119 (e.g., front-sleeve displays 703 and 705, back-sleeve displays 707 and 709, front displays 711 and 713, and back display 715). As mentioned, media to be presented on the wearable device 117 may be provided by advertisers, developers, or any other content provider. By way of example, the media can be an announcement as illustrated by front-sleeve display 703 and back-sleeve display 709 (e.g., "the 6-hour sale has ended"), a stock ticker as illustrated by front-sleeve display 705 and back-sleeve display 707, an advertisement as illustrated by back display 715, etc.

Figure 8:
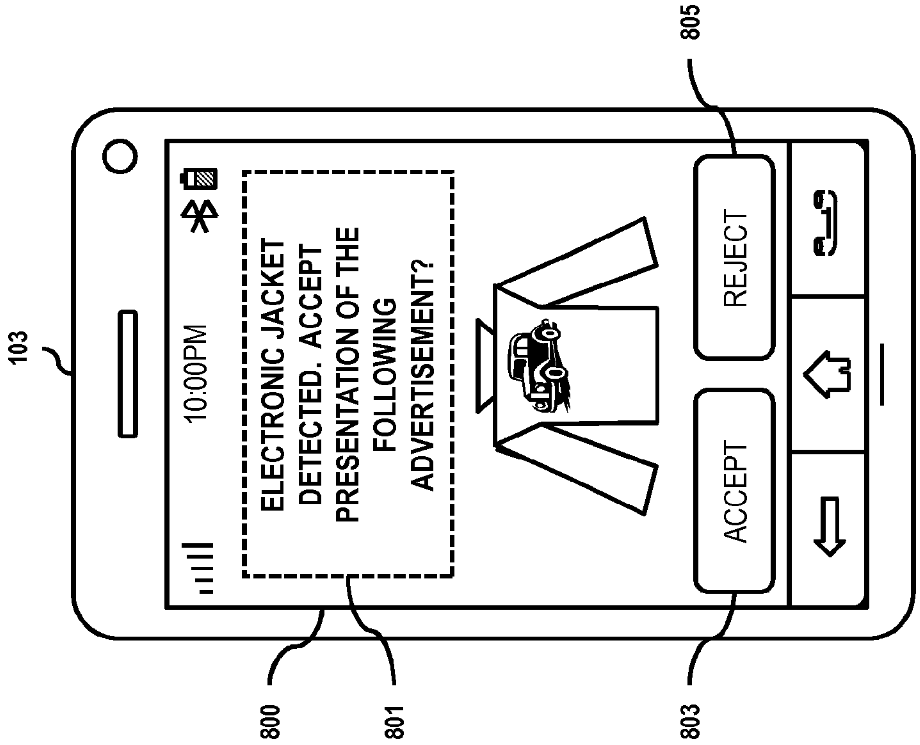
FIG. 8 is a diagram of a user interface for providing electronic media on clothing, according to an exemplary embodiment.

FIG. 8 is a diagram of a user interface for providing electronic media on clothing, according to an exemplary embodiment. For illustrative purposes, the diagram is described with reference to the system 100 of FIG. 1. For instance, FIG. 8 is a diagram of the mobile device 103 with the user interface 800 featuring a notification 801 and buttons 803 and 805 (e.g., "Accept" and "Reject"). As shown, media relating to an advertisement has been determined and transmitted to the mobile device 117 over the cellular network 109. The media, however, has not been transmitted to the wearable device 117 (e.g., electronic jacket) even though the wearable device 117 has been detected. Rather, in this case, the notification 801 is provided to the user to enable the user to "accept" or "reject" the advertisement as presented in the notification 801. In this way, media delivery services may allow its users some control over the advertisements and other media that may be presented on their respective wearable devices. As such, the media delivery services may utilize this approach to potentially attract a larger group of users.

The processes described herein for providing electronic media on wearable displays may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
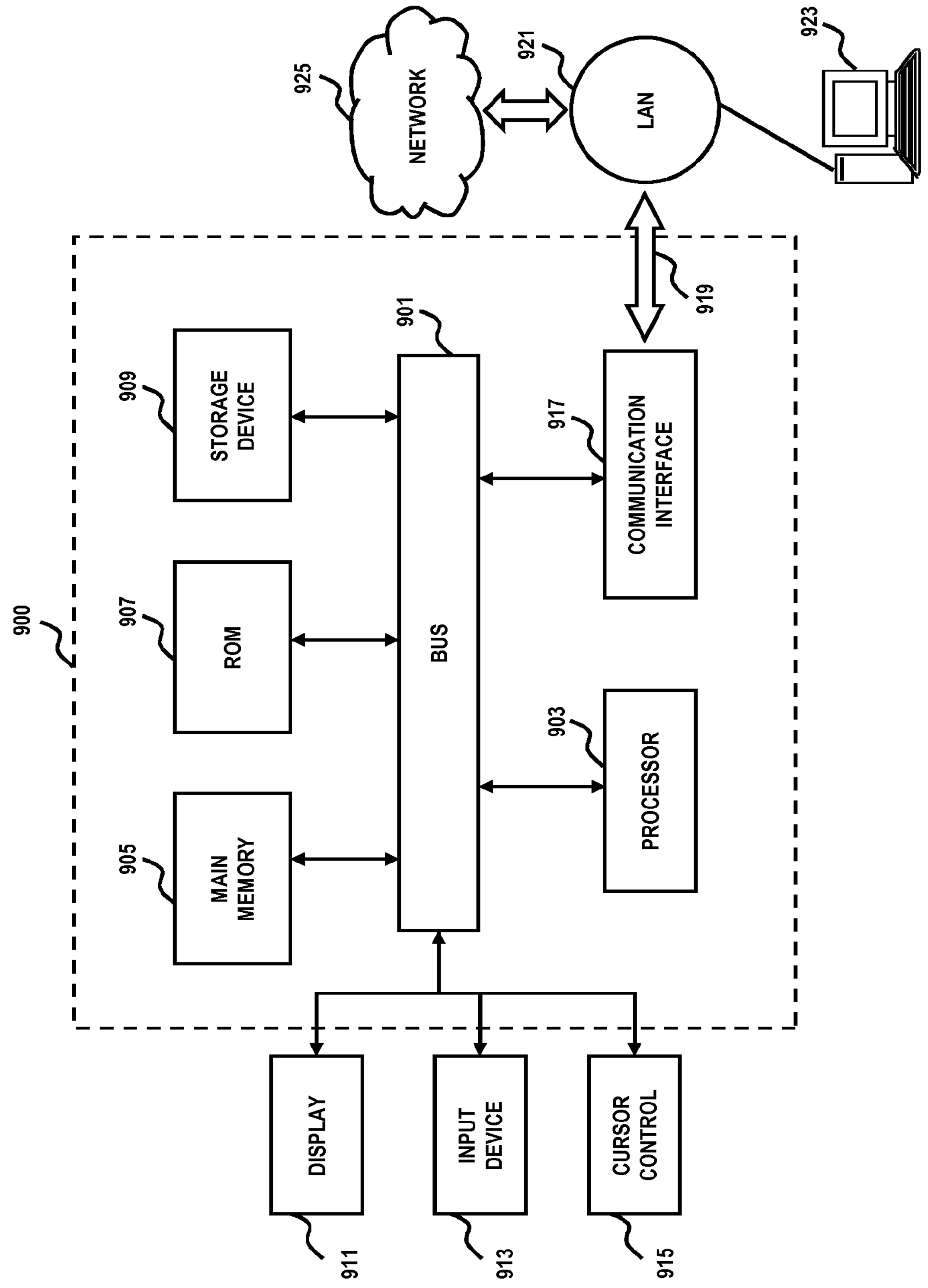
FIG. 9 is a diagram of a computer system that can be used to implement various exemplary embodiments.

FIG. 9 is a diagram of a computer system that can be used to implement various exemplary embodiments. The computer system 900 includes a bus 901 or other communication mechanism for communicating information and one or more processors (of which one is shown) 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk, flash storage, or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. Additional output mechanisms may include haptics, audio, video, etc. An input device 913, such as a keyboard including alphanumeric and other keys, is coupled to the bus 901 for communicating information and command selections to the processor 903. Another type of user input device is a cursor control 915, such as a mouse, a trackball, touch screen, or cursor direction keys, for communicating direction information and command selections to the processor 903 and for adjusting cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
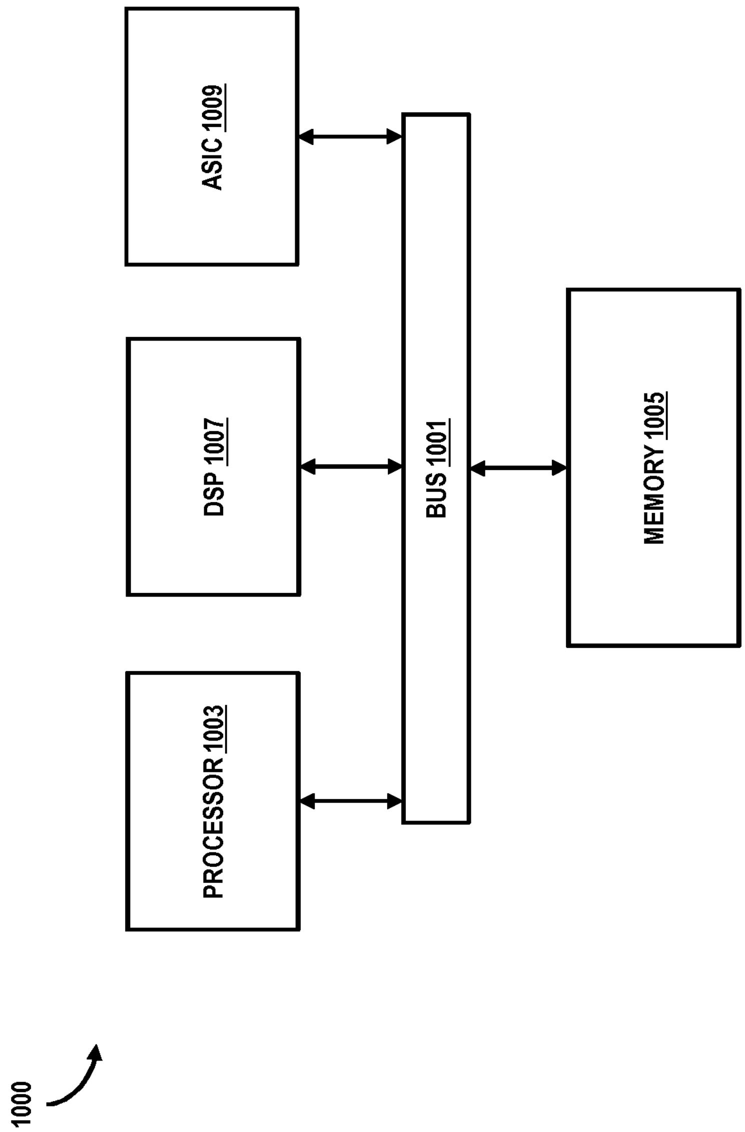
FIG. 10 is a diagram of a chip set that can be used to implement an embodiment of the invention.

FIG. 10 illustrates a chip set or chip 1000 upon which an embodiment of the invention may be implemented. Chip set 1000 is programmed to enable electronic media on clothing as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of enabling electronic media on clothing.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to enable electronic media on clothing. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

determining, by a processor, media to be presented on a wearable device that includes one or more displays;

determining whether the wearable device is registered with a media delivery service offered by a service provider;

determining one or more likelihoods corresponding to the one or more displays that the one or more displays may be viewed based on an activity of an individual wearing the wearable device;

specifying at least one of the one or more displays based, at least in part, on the determined one or more likelihoods that the one or more displays will be viewed; and initiating transfer of the media over a wireless network to the wearable device via a mobile device if the wearable device is registered with the media delivery service, wherein the media is presented on the specified at least one display of the one or more displays of the wearable device, wherein the wireless network includes a cellular network, and wherein determining registered wearable devices includes querying wearable devices for predefined values, wherein predefined values include a preset username and password, a product identifier, a personal identification number (PIN), other authentication mechanisms, or a combination thereof.

2. A method according to claim 1, wherein the wearable device is a clothing item, and the one or more displays include an electronic paper display.

3. A method according to claim 1, wherein the wearable device includes the mobile device or a separate receiver circuitry to receive the media.

4. A method according to claim 1, further comprising:

determining an amount of memory of the wearable device for presentation of the media; and filtering the media based on content according to the amount of memory.

5. A method according to claim 1, further comprising:

receiving one or more display identifiers specifying which of the one or more displays are to present the media.

6. An apparatus comprising:

at least one processor; and at least one memory including computer program code for one or more programs, the at least one memory and the computer program code configured to, with the at least one processor, cause the apparatus to perform at least the following, determine media to be presented on a wearable device that includes one or more displays;

determine whether the wearable device is registered with a media delivery service offered by a service provider;

determine one or more likelihoods corresponding to the one or more displays that the one or more displays may be viewed based on an activity of an individual wearing the wearable device;

specify at least one of the one or more displays based, at least in part, on the determined one or more likelihoods that the one or more displays will be viewed; and initiate transfer of the media over a wireless network to a mobile device if the wearable device is registered with the service, wherein the media is presented on the specified at least one display of the one or more displays of the wearable device, wherein the wireless network includes a cellular network, and wherein determining registered wearable devices includes querying wearable devices for predefined values, wherein predefined values include a preset username and password, a product identifier, a personal identification number (PIN), other authentication mechanisms, or a combination thereof.

7. An apparatus according to claim 6, wherein the wearable device is a clothing item, the one or more displays include an electronic paper display, and the wearable device includes the mobile device or a separate receiver circuitry to receive the media.

8. An apparatus according to claim 6, wherein the apparatus is further caused to:

determine an amount of memory of the wearable device for presentation of the media;

filter the media based on content according to the amount of memory; and receive one or more display identifiers specifying which of the one or more displays are to present the media.

9. A method comprising:

receiving media over a wireless network at a mobile device to be presented on a wearable device that includes one or more displays;

detecting presence of the wearable device;

establishing, by the mobile device, a communication link with the wearable device in response to the detected presence;

determining one or more likelihoods corresponding to the one or more displays that the one or more displays may be viewed based on an activity of an individual wearing the wearable device;

specifying at least one of the one or more displays based, at least in part, on the determined one or more likelihoods that the one or more displays will be viewed; and initiating transmission of the media to the wearable device over the communication link for presentation of the media on the specified at least one display of the one or more displays, wherein the wireless network includes a cellular network, and wherein determining registered wearable devices includes querying wearable devices for predefined values, wherein predefined values include a preset username and password, a product identifier, a personal identification number (PIN), other authentication mechanisms, or a combination thereof.

10. A method according to claim 9, wherein the communication link is established over another wireless network that is different from the wireless network.

11. A method according to claim 9, wherein the other wireless network is a short-range wireless network.

12. A method according to claim 9, wherein the wearable device includes the mobile device or a separate receiver circuitry to receive the media.

13. A method according to claim 9, further comprising:

receiving one or more display identifiers specifying which of the one or more displays are to present the media.

14. An apparatus comprising:

at least one processor; and at least one memory including computer program code for one or more programs, the at least one memory and the computer program code configured to, with the at least one processor, cause the apparatus to perform at least the following, receive media over a wireless network at a mobile device to be presented on a wearable device that includes one or more displays;

detect presence of the wearable device;

establish, by the mobile device, a communication link with the wearable device in response to the detected presence;

determine one or more likelihoods corresponding to the one or more displays that the one or more displays may be viewed based on an activity of an individual wearing the wearable device;

specify at least one of the one or more displays based, at least in part, on the determined one or more likelihoods that the one or more displays will be viewed; and initiate transmission of the media to the wearable device over the communication link for presentation of the media on the specified at least one display of the one or more displays, wherein the wireless network includes a cellular network, and wherein determining registered wearable devices includes querying wearable devices for predefined values, wherein predefined values include a preset username and password, a product identifier, a personal identification number (PIN), other authentication mechanisms, or a combination thereof.

15. An apparatus according to claim 14, wherein the communication link is established over another wireless network that is different from the wireless network, the other wireless network is a short-range wireless network, and the wearable device includes the mobile device or a separate receiver circuitry to receive the media.

16. An apparatus according to claim 14, wherein the apparatus is further caused to:

determine an amount of memory of the wearable device for presentation of the media;

filter the media based on content according to the amount of memory; and receive one or more display identifiers specifying which of the one or more displays are to present the media.

* * * * *